United States Patent

Deusser et al.

Patent Number: 5,419,928
Date of Patent: May 30, 1995

[54] SURFACE-MODIFIED PYROGENICALLY PRODUCED ALUMINUM OXIDE

[75] Inventors: Hans Deusser, Karlstein; Dieter Kerner, Hanau; Jürgen Meyer, Stockstadt; Günther Michael, Karlstein; Andreas Stubbe, Rodenbach, all of Germany

[73] Assignee: Degussa Aktiengesellschaft, Frankfurt am Main, Germany

[21] Appl. No.: 141,083

[22] Filed: Oct. 26, 1993

Related U.S. Application Data

[62] Division of Ser. No. 12,163, Jan. 28, 1993.

[30] Foreign Application Priority Data

Jan. 31, 1992 [DE] Germany ............... 42 02 694.6

[51] Int. Cl.⁶ .................................... B05D 1/02
[52] U.S. Cl. ...................... 427/384; 427/421
[58] Field of Search .................... 427/421, 384

[56] References Cited

U.S. PATENT DOCUMENTS 4,640,882  2/1987  Mitsuhashi et al. ............ 430/110
4,652,509  3/1987  Shirose et al. ................ 430/110

FOREIGN PATENT DOCUMENTS 3516937  11/1985  Germany.
4202694   7/1993  Germany.
58-185405 10/1983  Japan.

OTHER PUBLICATIONS

Translation of JP 58-216252.
Translation of JP 58-185405.
Translation of DE 3516937.
Abstract, JP 58-185405.
Abstract, JP 58-216252.

Primary Examiner—Shrive Beck
Assistant Examiner—Erma Cameron
Attorney, Agent, or Firm—Cushman, Darby & Cushman

[57] ABSTRACT

Surface-modified, pyrogenically produced aluminum oxide which is has the following physico-chemical properties:

| Surface | (m²/g) | 50 to 150 |
|---|---|---|
| Stamping density | (g/l) | 50 to 90 |
| Drying loss | (%) | <5 |
| Annealing loss | (%) | 5.0 to 15 |
| C content | (%) | 0.5 to 12 |
| pH | | 4 to 8. |

1 Claim, 1 Drawing Sheet

SURFACE-MODIFIED PYROGENICALLY PRODUCED ALUMINUM OXIDE

This is a division of application Ser. No. 08/012,163, filed Jan. 28, 1993.

The present invention relates to a surface-modified, pyrogenically produced aluminum oxide.

BACKGROUND OF THE INVENTION

It is known to use powdery toners containing pyrogenically produced surface-modified silicon dioxide in electrostatic developing processes. Various silanes, especially dimethyldichlorosilane are used for surface modification (See U.S. Pat. No. 3,720,617).

It is also known that pyrogenically produced silicon dioxide waterproofed with compounds of the general formula

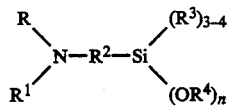

can be added to positively chargeable resin powders in order to increase their flowability (See published European Patent Application EP-A 0,293,009).

Published German Patent Application DE-A 12 09 427 discloses aluminum oxide whose surface has been modified with halogen silanes can be added to electrographic developing powders.

Published German Patent Application DE-A 34 26 685 (Canon) teaches the addition of aluminum oxide to positively chargeable toners in which the aluminum oxide has been treated simultaneously witch the adhesion promoter γ-aminopropyltriethoxy- silane and trimethylethoxysilane.

A similarly treated aluminum oxide is described in Published Japanese Patent Application JP-OS 31442 (Nippon Aerosil Corporation).

The known method has the disadvantage that it must use an organic solvent system. Alcohols, hydrocarbons and halogenated hydrocarbons are used as solvents which cannot be completely removed from the reaction product.

SUMMARY OF THE INVENTION

The object of the present invention is to avoid these problems and produce a solvent-free, waterproofed aluminum oxide.

The present invention provides a surface-modified, pyrogenically produced aluminum oxide which is surface modified with a silane mixture consisting of silane A (trimethoxyoctylsilane) and silane B (3-aminopropyltriethoxysilane) having the chemical formulas:

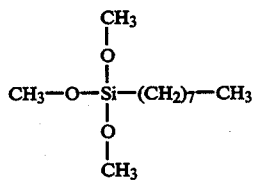

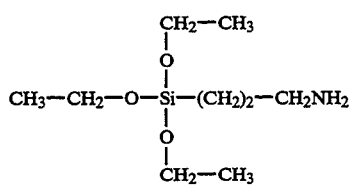

The surface-modified, pyrogenically produced aluminum oxide has the following physico-chemical properties:

| Surface | (m²/g) | 50 to 150 |
|---|---|---|
| Stamping density | (g/l) | 50 to 90 |
| Drying loss | (%) | <5 |
| Annealing loss | (%) | 0.5 to 15 |
| C content | (%) | 0.5 to 12 |
| pH | (%) | 4 to 8. |

The present invention also provides a method of producing the surface-modified, pyrogenically produced aluminum oxide in which the pyrogenically produced aluminum oxide is placed in a mixer and sprayed, with the mixer running, with the mixture of silane A and silane B. The silane and aluminum oxide are mixed after the addition of the silane mixture and, the resulting mixture is tempered at 100° to 150° C., preferably at 115° to 125° C.

The ratio of aluminum oxide to silane mixture can be 0.5 to 40 parts by weight silane mixture per 100 parts by weight aluminum oxide.

The silane mixture can consist of 1 to 99 parts by weight silane A and 99 to 1 parts by weight silane B.

A mixture can be used with preference consisting of 50±20 parts by weight silane A and 50±20 parts by weight silane B.

A particularly suitable aluminum oxide is Aluminum Oxide C which is produced pyrogenically from aluminum trichloride by flame hydrolysis in an oxyhydrogen flame and which has the following physico-chemical characteristics:

| | | Al₂O₃ C |
|---|---|---|
| Appearance | | |
| Surface according to BET m²/g | 100 ± 15 | |
| Average size of the primary particles | nanometer | 20 |
| Stamping density[1] | g/l | — |
| Drying loss[2] (2 hours at 105° C.) | % | <5 |
| Annealing loss[2,6] (2 hours at 1000° C.) | % | <3 |
| pH[3] (in 4% aqueous dispersion) | | 4–5 |
| SiO₂[5] | % | <0.1 |
| Al₂O₃[5] | % | >99.6 |
| Fe₂O₃[5] | % | <0.02 |
| TiO₂[5] | % | <0.1 |
| HCl[5,1)] | % | <0.5 |
| Sieve residue[4] according to Mocker (45 m) | % | <0.05 |
| packing drum size (net) | | |
| normal goods | kg | 5 |
| compressed goods | kg | |

-continued (additive "V")

Technical data of the AEROSIL standard types
1) according to DIN 53 194
2) according to DIN 55 921
3) according to DIN 53 200
4) according to DIN 53 580
5) relative to the substance annealed 2 hours at 1000° C.
6) relative to the substance dried 2 hours at 105° C.
7) HCl content is a component of the annealing loss The waterproofed aluminum oxide of the invention has the advantage that it has no solvent components. It can be used in toners for copiers.

BRIEF DESCRIPTION OF FIGURE OF DRAWING

The drawing is a graph plotting charge per unit mass as a function of activation time for raw toner and treated toner.

DETAILED DESCRIPTION OF PREFERRED EMBODIMENTS

Figure 1:
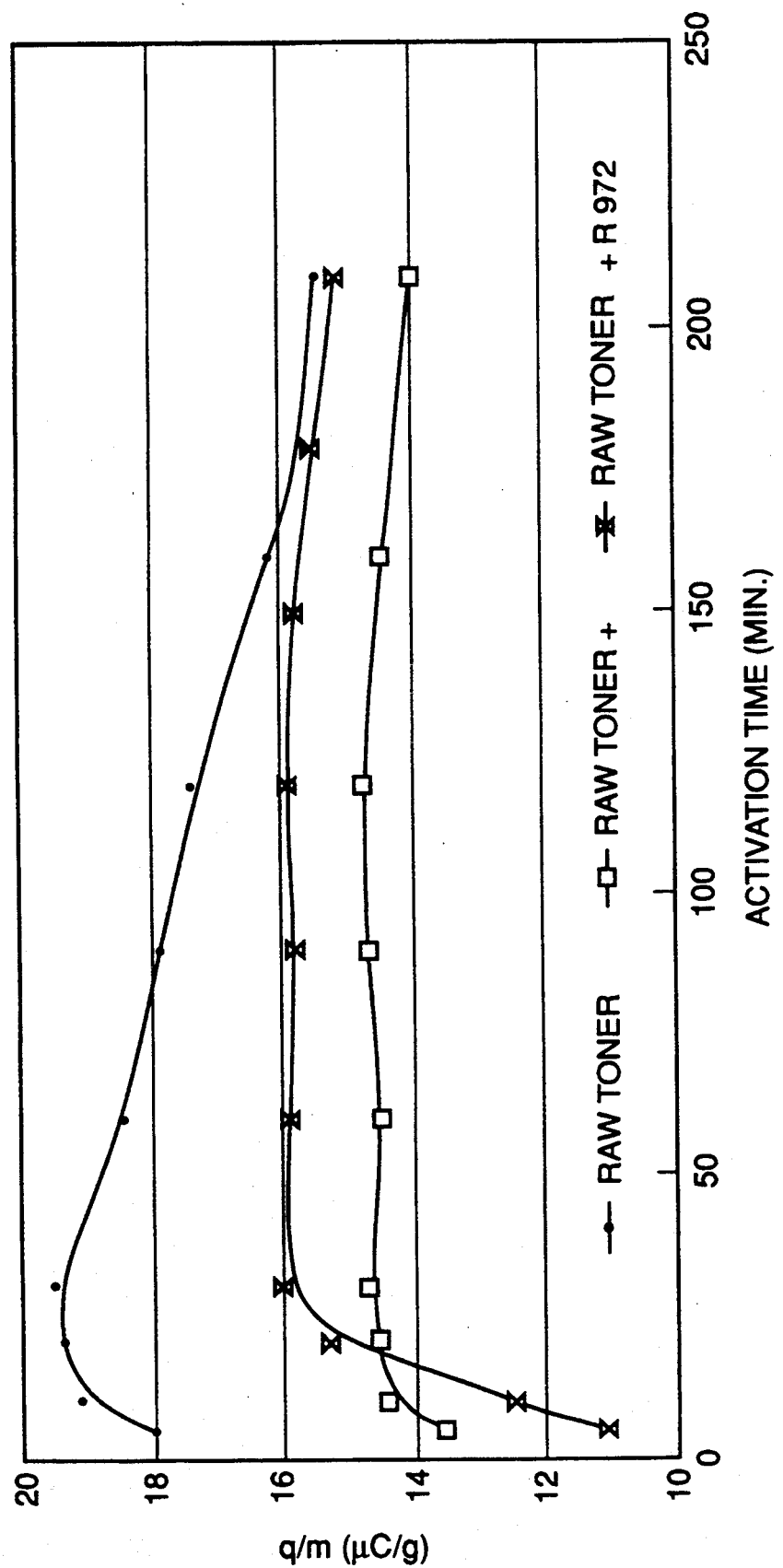

The following examples illustrate the invention.

Example 1

2 kg $Al_2O_3$ C produced pyrogenically from aluminum trichloride in an oxyhydrogen flame and having the properties given above are placed in a 135 liter Lodige mixer and sprayed with 100 g of a silane mixture consisting of 50 g trimethoxyoctylsilane and 50 g 3-aminopropyltriethoxysilane with the mixer running. The mixture is mixed for 15 minutes more. The silanized oxide is tempered 2 hours at 120° C.

Physico-chemical properties of the surface-modified aluminum oxide

| Carrier | | $Al_2O_3$ C |
|---|---|---|
| Surface | (m²/g) | 92 |
| Stamping density | (g/l) | 70 |
| Drying loss | (%) | 0.9 |
| Annealing loss | (%) | 5.3 |
| C content | (%) | 2.9 |
| pH | | 5.7 |

| | |
|---|---|
| Pigment black Printex 35 | 7% |
| Copy-Blau PR (Hoechst AG) | 3% |
| Toner resin | 90% |

The repeated activation was tested with this toner and a high charge stability in comparison to the raw toner was determined (see FIG. 1).

Copy-Blau PR is a charge regulating agent for positive toners. It is characterized as follows: Area of application:

1. Charge regulating agents for positive toners (1- or 2-component toners for copiers or laser printers)
2. Clearing agents for black toners

| | |
|---|---|
| Chemical characterization: | triphenylmethane derivative |
| Thermal resistance: | >200° C. |
| Solubility: | insoluble in water |
| | slightly soluble in organic solvents |

The toner resin used is characterized as follows:

| | Unit | Theoretical value |
|---|---|---|
| Melt flow Index[1] (150° C./2, 16 kp) | g/10 min | 5–10 |
| Viscosity number[2] | cm³/g | 37–43 |
| Weight loss[3] | % by weight | <1 |
| Residual monomers[4] | % by weight | <0.35 |
| Styrene | | <0.25 |
| n-BMA | | <0.10 |
| Other product properties: | | |
| Monomer composition | 70% by weight styrene | |
| | 30% by weight n-butylmethacrylate | |
| Glass transition temperature Tg[5] | 60–65° C. | |
| Average grain diameter[6] (d 50% RS) | 0.200–0.314 mm | |

[1] DIN 53 735, 2/88 edition Specimen pretreatment: Drying at 50° C. oil pump vacuum, 1 hour or 4 hours drying oven, 50° C.
[2] DIN 7745, 1/80 edition
[3] IR drier until weight constancy
[4] Gas chromatography
[5] DSC method, ASTM D 3418/75
[6] DIN 53 734, 1/73 edition, evaluation according to DIN 6 141, 2/74 edition RCF (regular color furnace)
Density: (g/cm³) 1.8–1.9

Product specifications

| Printex 35 RCF | Class | Depth of Color M$_\gamma$-value | Color Strength IRB 3 = 100 | DBP Adsorption (mg/100 g) powder beads Powder | Beads | Volatile Components (%) | pH | Extract contents toluene (%) | Sieve Residue (%) |
|---|---|---|---|---|---|---|---|---|---|
| Furnace Blacks Printex 35 | RCF | 236 | 100 | 42 | 42 | 0.9 | 9.5 | <0.1 | 0.05 |

Further technical data

| | Ashing Residue | Stamping Density Powder | Beads | Particle Size (nm) | BET Surface (m²/g) |
|---|---|---|---|---|---|
| Furnace Blacks Printex 35 | 0.3 | 420 | 550 | 31 | 65 |

Example 2

The aluminum oxide waterproofed according to Example 1 is tested in a positive toner system. The toner system consists of the following components:

The q/m measurement takes place under the following conditions:
98% carrier (spherical ferrite (80–100 m))
2% aluminum oxide according to Example 1
Activation: Rolling fixture, 360 rpms in 40 ml glass bottle, weighed portion 40 g, developer
What is claimed is:

1. A method of producing a surface-modified, pyrogenically produced aluminum oxide which has been surface modified with a mixture of silane A and silane B corresponding to the chemical formulas:

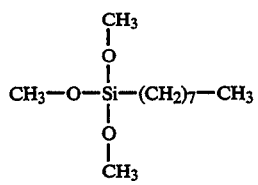 Silane A

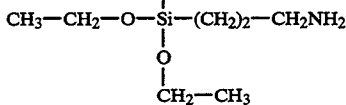 Silane B said surface-modified pyrogenically produced aluminum oxide having the following physico-chemical properties:

| Surface | (m²/g) | 5 to 150 |
|---|---|---|
| Stamping Density | (g/l) | 50 to 90 |
| Drying Loss | (%) | <5 |
| Annealing Loss | (%) | 0.5 to 12 |
| Carbon Content | (%) | 0.5 to 12 |
| pH | | 4 to 8. | said method comprising placing aluminum oxide in a mixer, spraying the aluminum oxide with a mixture of Silane A and Silane B, mixing the silane mixture and the aluminum oxide, and tempering the resulting mixture at 100° to 150° C., the ratio of silane mixture to aluminum oxide being 0.5 to 40 parts by weight of silane mixture per 100 parts by weight of aluminum oxide.

* * * * *